US009032361B2

(12) United States Patent
Dhalait

(10) Patent No.: US 9,032,361 B2
(45) Date of Patent: May 12, 2015

(54) AGILE UNIT AND REGRESSION TESTING FRAMEWORK FOR DOMAIN SPECIFIC LANGUAGES

(75) Inventor: ShamimAhmad Dadamir Dhalait, San Antonio, TX (US)

(73) Assignee: Tata Consultancy Services Limited, Mumbai Maharashtra (IN)

(*) Notice: Subject to any disclaimer, the term of this patent is extended or adjusted under 35 U.S.C. 154(b) by 259 days.

(21) Appl. No.: 13/494,256

(22) Filed: Jun. 12, 2012

(65) Prior Publication Data

US 2013/0159963 A1 Jun. 20, 2013

Related U.S. Application Data

(60) Provisional application No. 61/576,145, filed on Dec. 15, 2011.

(51) Int. Cl.
*G06F 9/44* (2006.01)
*G06F 11/36* (2006.01)

(52) U.S. Cl.
CPC .......... *G06F 11/368* (2013.01); *G06F 11/3684* (2013.01)

(58) Field of Classification Search
CPC ............... G06F 8/10; G06F 8/20; G06F 8/24; G06F 11/368; G06F 11/3684
USPC ........................................................ 717/104
See application file for complete search history.

(56) References Cited

U.S. PATENT DOCUMENTS

| 4,558,413 | A | * | 12/1985 | Schmidt et al. ............... 717/170 |
|---|---|---|---|---|
| 6,324,486 | B1 | * | 11/2001 | Crook et al. .................. 702/117 |
| 7,681,180 | B2 | | 3/2010 | de Halleux et al. |
| 8,028,276 | B1 | * | 9/2011 | Bessonov ...................... 717/124 |
| 8,069,434 | B2 | | 11/2011 | Ploesser et al. |
| 2004/0153830 | A1 | * | 8/2004 | Cebula et al. .................... 714/38 |
| 2005/0096937 | A1 | * | 5/2005 | Subash et al. ..................... 705/1 |
| 2006/0069961 | A1 | * | 3/2006 | Kalyanaraman ................ 714/38 |
| 2006/0174243 | A1 | * | 8/2006 | Brewer et al. ................. 717/174 |
| 2008/0155367 | A1 | * | 6/2008 | Boskovic ....................... 714/736 |
| 2010/0153494 | A1 | * | 6/2010 | Loupia et al. ................. 709/203 |
| 2010/0199058 | A1 | * | 8/2010 | Szowa et al. .................. 711/171 |

OTHER PUBLICATIONS

Hariri, Hadi, "ReSharper 6 Introduces Support for JavaScript Unit Testing with QUnit", Mar. 25, 2011 accessed Jun. 12, 2012 http://blogs.jetbrains.com/dotnet/2011/03/resharper-6-introduces-support-for-javascript-unit-testing/.
Ajaxian, "QUnit—A JavaScript Unit Testing Framework" Oct. 1, 2009 accessed Jun. 12, 2012 http://ajaxian.com/archives/qunit-a-javadcript-unit-testing-framework.
IBM, "IBM Integrated Development and Test Environment" accessed Jun. 12, 2012 http://www-935.ibm.com/services/us/en/business-services/ibm-integrated-development-and-test-environment.html.

* cited by examiner

*Primary Examiner* — Anna Deng
(74) *Attorney, Agent, or Firm* — Hayes Soloway PC

(57) ABSTRACT

According to one aspect of the invention, a system and method for unit and regression testing has been developed. The system is capable to automate unit/regression test case preparation, remote execution, provide XML based assert mechanism to evaluate test results, maintenance and versioning. The present system enables model driven testing of domain specific languages and provides a user friendly mechanism to perform Unit and Regression Testing.

15 Claims, 3 Drawing Sheets

AGILE UNIT AND REGRESSION TESTING FRAMEWORK FOR DOMAIN SPECIFIC LANGUAGES

CROSS-REFERENCE TO RELATED APPLICATION

This application claims priority to U.S. Provisional Application entitled, "AGILE UNIT AND REGRESSION TESTING FRAMEWORK FOR DOMAIN SPECIFIC LANGUAGES," having Ser. No. 61/576,145 filed Dec. 15, 2011, which is entirely incorporated herein by reference.

FIELD OF THE INVENTION

The present invention relates generally to the domain of testing. More particularly, the invention relates to a unit and regression testing of model aware domain specific languages.

BACKGROUND OF THE INVENTION

Testing has always been a crucial part in development of any product. Unfortunately, in addition to ad-hoc changing business requirements, a pressure to meet strict project deadlines along with dynamic real-time scenarios and, often a product testing is neglected and given less priority. Particularly, while testing, a conventional approach of integration and system testing is predominantly preferred over a unit testing to avoid repetitive test cases creation. If testing is avoided at unit level it often results in cumbersome debugging at unit level for errors detected during integration or system testing.

Traditionally while unit testing, a "Code First and Write Test case Next [CFWN]" approach is employed and thus development and testing frameworks are designed accordingly in compliance with the said approach. This approach, in addition to being time consuming and effort prone, doesn't provide for an integrated environment for testing and development. Thus a developer is forced to switch between integrated development environment IDE's compromising the user friendliness of the environment.

Alternatively, a test driven development (TDD) approach is observed to be efficient in offering greater flexibility to unit testing practice and is adaptable to design an integrated development environment. In one of his findings and while modifying the TDD approach, Mr. Kent Beck of Three Rivers Institute, also observed that TDD and XP suggest that there is no need to add abstraction layers for extensibility until there is actually a need for them. However, still the development community is not sure about exploring this approach because of pertinent issues faced while initiating development itself and lack of such an integrated development platform.

Moreover, in the existing development environment practicing TDD, developers need to manually develop the test cases. One of the systems Zen Test, though discloses automation of the test cases development, however, still faces a problem with reusability of those test cases.

Thus, while choosing TDD for an effective employment of a development process, an automated test case generation system is desirable that would optimize the overall development. In one of the publications, "Wasting Time With Test Driven Development", Mr. Vineet Sinha of architex acknowledges the shortcomings of the TDD approach, which includes lack of 100% code coverage, absence of user feedback, poor quality of documentation, architectural standards are not maintained and many a times the approach can be a roadblock for innovation.

Even though while aforesaid problems persist with TDD, a dominant and comprehensive advantage of reduced time of work, evolving and adapting to changing environment, simple unit test case generation is believed to be far more beneficial to the development community.

In Code First Test Next (CFTN) approach, post execution, developers need to manually inspect each output file. Moreover, these test cases are not versioned for future reusability; hence there are fair chances of them getting purged over period of time.

Though, there are systems like Xunit.net that provide test cases to comply with TDD for an efficient development, however, these systems don't facilitate combining of various test cases together as a test suite, as such test suit is observed to be effective in triggering a regression testing.

In light of the foregoing problem, there is a need of a robust as well as a structured and user-friendly system of unit/regression testing capable of testing large scale business critical and database centric enterprise applications while complying with all the real-time aspects that arise during testing.

OBJECTIVES OF THE INVENTION

The principle object of the present invention is to develop a unit/regression framework that supports agile methodology of "Prepare Test first and Code next."

Another significant object of the invention is to develop robust and user friendly unit/regression testing solution for large scale business applications.

It is another object of the present invention to enable model driven testing of domain specific language in general.

Another significant object of the present invention is to provide a user friendly, XML based assert mechanism to compare expected and actual output of unit test module.

Yet another object of the invention is to provide an integration of development and testing environments.

Another object of the invention is to facilitate versioning of test cases for future reuse.

SUMMARY

In one of the preferred embodiments of the present invention, a system and method for unit and regression testing is envisaged to offer greater flexibility and a XML based assert mechanism for comparing expected and actual output to the development environment designed in compliance with TDD approach. The system is configured to automate unit/regression test case preparation, remote execution, maintenance and versioning such that developers even before initiating development would able to envision the test cases. The system inherits Xunit family of unit and regression testing frameworks to provide a unique solution to address unit and regression testing of domain specific languages in model driven testing environment.

The system comprises of a repository, a modeling unit, code generating module, an executing module and a comparing module. The system enables combining of all test cases together to form a test suite and triggers them as regression test-suite. In one of the embodiment of the invention, an Eclipse plug-in is employed to code business logic using an intelligent text editor. The system automates the process of submitting test cases and writes output to a flat file. In a preferred embodiment, the code is checked into Star Team for versioning and ensuring reusability of test cases.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. These and other features of the present invention will become more fully apparent from the following description, or may be learned by the practice of the invention as set forth hereinafter.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific system and method disclosed in the drawings.

DETAILED DESCRIPTION OF THE INVENTION

Some embodiments of this invention, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described.

The present invention describes a system to automate unit/regression test case preparation, remote execution, XML based assertion of test results, maintenance and versioning of the same. The invention provides a unique solution to address unit and regression testing of domain specific languages in model driven testing environment.

Figure 1:
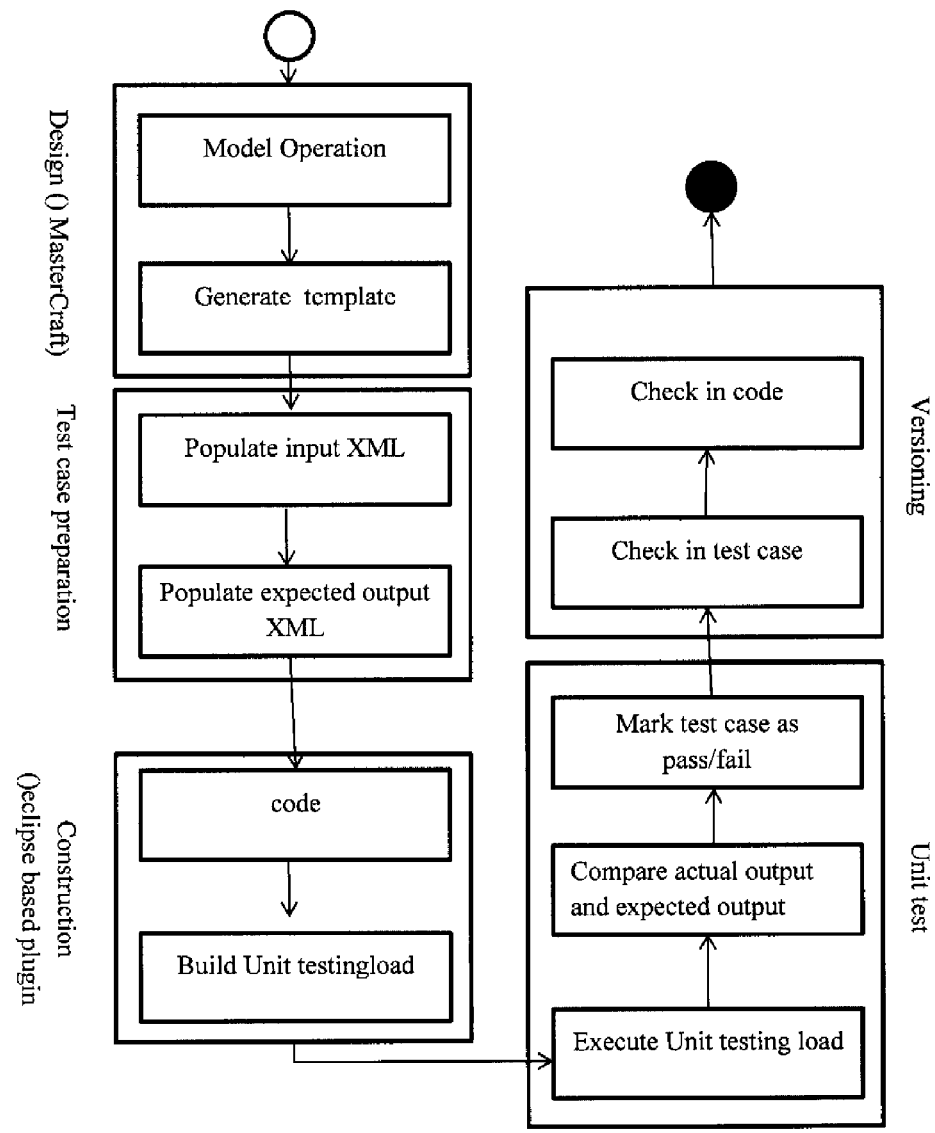
FIG. 1 depicts the logical flow of the system and the various stages involved in the same.

Referring to FIG. 1, the diagram depicts the logical flow of the system and shows the main stages involved in the system. FIG. 1 shows the 5 main stages of designing test cases, test case preparation, construction, unit testing and finally versioning of the test cases. The designing stage involves modeling and generation of templates using MasterCraft®—an integrated framework to develop large scale distributed enterprise applications using model driven techniques. MasterCraft comprises of a modeling tool, code generators, high level specification language, GUI generator and runtime libraries. MasterCraft® generated code templates are used to build unit and integration test drivers. Modeling unit provides an user interface to capture class model of application design. Model entered by user is stored in a centralized repository which is later queries to export model to generated operations and other artifacts. Test case preparation involves populating of input XML and expected output XML. The construction phase consists of writing code and building unit test load with the help of eclipse plug-in.

In the next phase of unit testing, execution of unit test load is done and actual output and expected output are compared. The unit test load comprises of object binaries, drive modules and application library code. All of these components work collaboratively to retrieve any code/design defect from the results. The application design and/or code are again modified accordingly. Lastly in the versioning phase using Star Team the test cases are checked in for further reusability. Users can manually check-in the test cases in version management tools like Star Team and the like for future reuse and to build regression test suites.

Figure 2:
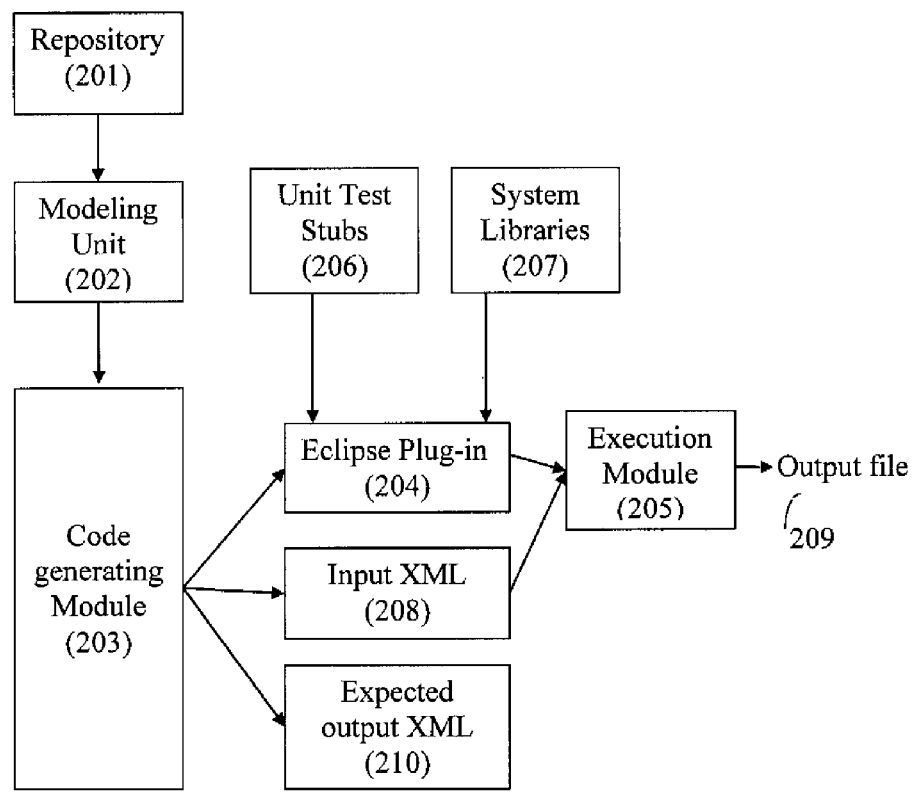
FIG. 2 represents the various components of the system.

Now referring to FIG. 2, various components required to implement the present invention is provided. A modeling unit (202), which accepts input from the repository (201), models artifacts to generate a unit testing module or an operation (200).

Further referring to FIG. 2, a code generating module (203) is used to create blank operation template. The blank template includes the empty operation shell used by developer to code the business logic. For this purpose the code generating module (203) uses MasterCraft® tool. MasterCraft® automated code generators are executed on model to generate Q++ code templates and application library code. These code generators run on OMVS. The code generating module (203) also generates input XML (208) and expected output XML (210).

Still further referring to FIG. 2, an eclipse plug-in (204), is used to code business logic in Q++ language using intelligent text editor. The code generated by the code generating module (203) is compiled from an action plug-in which invokes remote command to copy code, translate and invoke C++ compiler on mainframe. The eclipse plug-in uses unit test stubs (206) and system libraries (207) to create an executable unit test load. Unit test stubs consists of wrappers to call business functionality coded by developer using operation template. System libraries are shipped with MasterCraft® toolset and include functionalities to provide utility classes, file read-write, memory management and database communication wrappers.

Still further referring to FIG. 2, an execution module (205) provides an option on the system to auto-submit a job from eclipse plug-in. This internally invokes JCL that reads input XML (208), calls unit test load to execute the code and write the output to output file (209).

Figure 4:
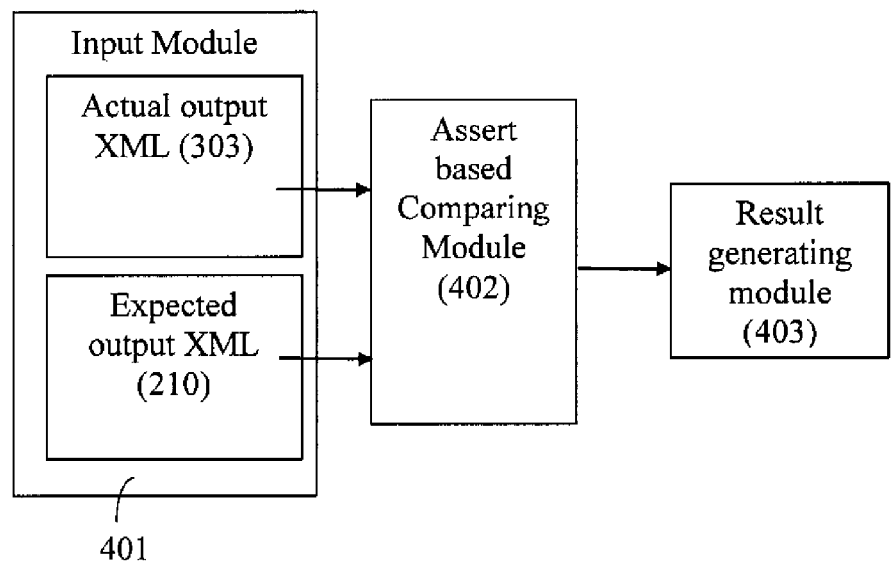
FIG. 4 highlights the steps used to obtain the result from the result generating module.

Still further referring to FIG. 2, an expected output XML (210) generated by the code generating module (203) is further used during assert based comparison as discussed in FIG. 4.

Figure 3:
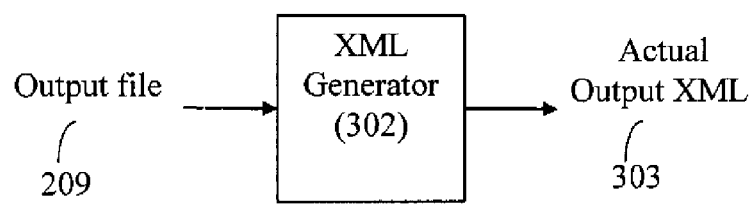
FIG. 3 shows the components involved in the process of generating the output file1.

Now referring to FIG. 3, a XML Generator (302) present in the system is used to generate actual output XML (303) based on the output file (209) generated by text execution (205).

Now referring to FIG. 4, an input module (401) consisting of the Actual Output XML (303) and the Expected output XML (210) is compared by using an assert based comparing module (402). The assert based comparing module (402) compares the actual output XML (303) and the Expected output XML (210) and automatically decides whether the test case has passed or failed.

The result generating module (403) reports the defects unveiled during comparison. The defects can be either design defects or logical defects in the code. These defects are reported back and iteratively the process is repeated until the test case passes.

In a preferred embodiment of the invention, the valid test cases are selected by developer and manually checked in version management tools like Star Team and the like for future reuse and to build regression test suites. Code is checked before moving to integration/System testing.

While considerable emphasis has been placed herein on the particular features of this invention, it will be appreciated that various modifications can be made, and that many changes can be made in the preferred embodiments without departing from the principles of the invention. These and other modifications in the nature of the invention or the preferred embodiments will be apparent to those skilled in the art from the disclosure herein, whereby it is to be distinctly understood that the foregoing descriptive matter is to be interpreted merely as illustrative of the invention and not as a limitation.

The invention claimed is:

1. A method of unit and regression testing for model aware domain specific languages, the method comprising a processor implemented steps of:
    modeling an operation present in a repository for a test driven development process, the operation comprising a specification of designing requirements for testing to generate an application library code;
    generating a blank operation template from the application library code thereof corresponding to the operation, the blank operation template comprising an input XML and an expected output XML thereof, wherein the input XML refers to a set of test cases, and the expected output XML refers to results that are expected post running of the set of the test cases;
    building an executable unit test load to integrate business logic therein by using predefined unit test stubs and system libraries;
    executing the unit test load and comparing a resulting actual output XML with the expected output XML to determine states of the set of the test cases, wherein a state of a test case refers to either pass state or fail state;
    identifying defects unveiled during the comparison; and
    versioning the test cases for the future reusability by selecting valid test cases with the pass states, wherein the valid test cases are used to build regression test suites, wherein the regression test are used for performing regression testing, wherein regression testing comprises executing an entirety of the regression test suites to uncover unknown defects to all parts of an enterprise computer application due to a change at a unit level of the enterprise computer application.

2. The method of claim 1, wherein the operation refers to a unit testing module.

3. The method of claim 1, wherein the repository consists of artifacts but not limited to input XML files, expected output XML files, regression test suite metadata and the like.

4. The method of claim 1, wherein the application library code provides functionalities of sophisticated memory management and object oriented view of database.

5. The method of claim 1, wherein the blank operation template refers to a template generated by MasterCraft.

6. The method of claim 1, wherein the unit test load comprises of dependent components of drive modules, object binaries and application code library.

7. The method of claim 1, wherein the blank operation template further comprises an empty operation shell, wherein the business logic is encoded in model aware domain specific language with the empty operation shell using an eclipse plug-in, wherein the eclipse plug-in uses the predefined unit test stubs and system libraries.

8. A computerized system of unit and regression testing for domain specific languages, the system having at least a memory storing a plurality of modules and a processor for executing code of plurality of modules, the plurality of modules of the system comprising:
    an input module, stored in the memory, configured to generate an input XML and an expected output XML, wherein the input XML refers to a set of input test cases, and the expected output XML refers to results that are expected post running of the set of the test cases;
    a modeling unit, stored in the memory, adapted to accept input from a repository and generate an operation for testing in a test driven development process;
    a code generating module, stored in the memory, coupled with the repository and is configured to generate domain specific language code templates and an application library code for operations accessed from the repository;
    an executing module, stored in the memory, configured to invoke a function that reads the input XML and call an unit test load to write output to an output file;
    a comparing module, stored in the memory, adapted to compare a resulting actual output XML with the expected output XML, assign a flag to each compared test case in the set of test cases to indicate a state of the each compared test case in the set of the test cases, wherein the state of the each compared test case refers to either pass state or fail state; and
    a result generating module, stored in the memory, adapted to report defects unveiled during comparison, wherein the test cases with pass state are used to build regression test suites, wherein the regression test suites are used for performing regression testing, wherein regression testing comprises executing an entirety of the regression test suites to uncover unknown defects to all parts of an enterprise computer application due to a change at a unit level of the enterprise computer application.

9. The system of claim 8, wherein the function refers to Job Control Language.

10. The system of claim 8, wherein the output file refers to the output file generated post execution of the test procedures.

11. The system of claim 8, wherein the operation refers to a unit testing module.

12. The system of claim 8, wherein the repository consists of artifacts including but not limited to input XML files, expected output XML files, regression test suite metadata and the like.

13. The system of claim 8, wherein the application library code provides functionalities of sophisticated memory management and object oriented view of database.

14. The system of claim 8, wherein the blank operation template refers to a template generated by MasterCraft.

15. The system of claim 8, wherein the unit test load comprises of dependent components of drive modules, object binaries and application code library.

* * * * *